(12) United States Patent
Miyata et al.

(10) Patent No.: US 10,000,179 B2
(45) Date of Patent: Jun. 19, 2018

(54) AIRBAG, AIRBAG DEVICE, AND AUTOMOBILE

(71) Applicant: TAKATA CORPORATION, Tokyo (JP)

(72) Inventors: Yasuhito Miyata, Shiga (JP); Kazuhiro Abe, Shiga (JP); Shinji Hayakawa, Shiga (JP)

(73) Assignee: TAKATA CORPORATION, Tokyo (JP)

( * ) Notice: Subject to any disclaimer, the term of this patent is extended or adjusted under 35 U.S.C. 154(b) by 0 days. days.

(21) Appl. No.: 15/434,790

(22) Filed: Feb. 16, 2017

(65) Prior Publication Data

US 2017/0247013 A1 Aug. 31, 2017

(30) Foreign Application Priority Data

Feb. 29, 2016 (JP) .................. 2016-037413

(51) Int. Cl.
| | |
|---|---|
| *B60R 21/239* | (2006.01) |
| *B60R 21/205* | (2011.01) |
| *B60R 21/235* | (2006.01) |
| *B60R 21/276* | (2006.01) |
| *B60R 21/268* | (2011.01) |
| *B60R 21/00* | (2006.01) |

(52) U.S. Cl.
CPC .......... *B60R 21/239* (2013.01); *B60R 21/205* (2013.01); *B60R 21/235* (2013.01); *B60R 21/268* (2013.01); *B60R 21/276* (2013.01); *B60R 2021/0048* (2013.01); *B60R 2021/2395* (2013.01); *B60R 2021/23514* (2013.01); *B60R 2021/23538* (2013.01); *B60R 2021/23542* (2013.01); *B60R 2021/23576* (2013.01); *B60R 2021/2765* (2013.01)

(58) Field of Classification Search
CPC ... B60R 21/239; B60R 21/205; B60R 21/235; B60R 21/276
USPC .................................... 280/732, 736
See application file for complete search history.

(56) References Cited

U.S. PATENT DOCUMENTS

| | | | |
|---|---|---|---|
| 6,290,257 B1 * | 9/2001 | Bunce ................... | B60R 21/217 280/735 |
| 6,786,505 B2 * | 9/2004 | Yoshida ................ | B60R 21/233 280/729 |
| 6,971,670 B1 * | 12/2005 | Eriksson ............... | B60R 21/231 280/739 |
| 6,971,671 B2 * | 12/2005 | Schneider ............. | B60R 21/239 280/739 |
| 7,314,228 B2 | 1/2008 | Ishiguro et al. | |
| 7,325,830 B2 | 2/2008 | Higuchi et al. | |

(Continued)

FOREIGN PATENT DOCUMENTS

| | | | |
|---|---|---|---|
| EP | 1 245 461 B1 | 11/2006 | |
| EP | 1 338 480 B1 | 9/2009 | |

(Continued)

*Primary Examiner* — Faye M Fleming
(74) *Attorney, Agent, or Firm* — Fitch, Even, Tabin & Flannery LLP

(57) ABSTRACT

An airbag is a passenger seat airbag that inflates and deploys between a passenger seat and an instrument panel, and has side vent holes and a front vent hole. When an inflator is actuated in a state where a passenger close to the instrument panel exists, a valve cloth opens the front vent hole with the vicinity of the front vent hole away from the windshield.

4 Claims, 5 Drawing Sheets

(56) References Cited

U.S. PATENT DOCUMENTS

| | | | |
|---|---|---|---|
| 7,722,080 B2* | 5/2010 | Rose | B60R 21/2338 |
| | | | 280/743.2 |
| 7,984,924 B2 | 7/2011 | Yamada et al. | |
| 8,851,513 B2* | 10/2014 | Tsujimoto | B60R 21/205 |
| | | | 280/732 |
| 9,061,646 B2* | 6/2015 | Abele | B60R 21/239 |
| 9,272,685 B2* | 3/2016 | Fischer | B60R 21/2338 |
| 2004/0262898 A1* | 12/2004 | Bauer | B60R 21/276 |
| | | | 280/739 |
| 2006/0192370 A1* | 8/2006 | Abe | B60R 21/0132 |
| | | | 280/735 |
| 2007/0108750 A1* | 5/2007 | Bauer | B60R 21/233 |
| | | | 280/740 |
| 2017/0129447 A1* | 5/2017 | Takebayashi | B60R 21/205 |

FOREIGN PATENT DOCUMENTS

| | | | |
|---|---|---|---|
| JP | 2001-260800 A | | 9/2001 |
| JP | 2003-200803 A | | 7/2003 |
| JP | 2006-27374 A | | 2/2006 |
| JP | 2007-38713 A | | 2/2007 |
| JP | 2010064592 A | * | 3/2010 |
| JP | 2014-172591 A | | 9/2014 |

* cited by examiner

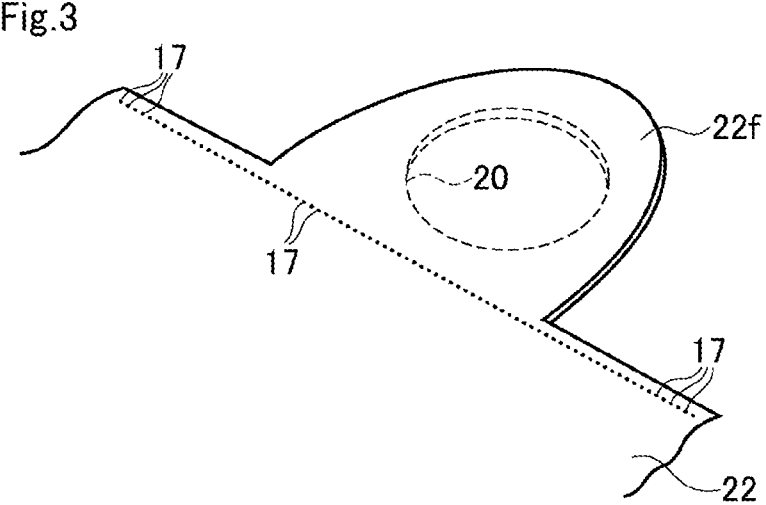

AIRBAG, AIRBAG DEVICE, AND AUTOMOBILE

CROSS-REFERENCE TO RELATED APPLICATION

This application is based upon and claims the benefit of priority from the prior Japanese Patent Application No. 2016-037413, filed on Feb. 29, 2016, the entire contents of which are incorporated herein by reference.

FIELD OF INVENTION

The present invention relates to an airbag and an airbag device for restraining a passenger seat occupant of an automobile during a collision or the like, and an automobile equipped with this passenger seat airbag device. In the present invention, front-back, top-bottom, and left-right directions correspond to the front-back, top-bottom, and left-right directions of the vehicle unless otherwise noted.

BACKGROUND OF INVENTION

A passenger seat airbag device is housed in an instrument panel, and inflates and deploys an airbag and restrains a passenger seat occupant in an emergency.

Patent Literatures 1 and 2 describe a passenger seat airbag device that takes into account a passenger seat occupant close to the instrument panel.

Patent Literature 3 describes an airbag that is provided with a vent hole at a position in the front surface of the airbag and in contact neither the windshield nor the instrument panel when the airbag is inflated.

[Patent Literature 1] JP2003-200803A
[Patent Literature 2] JP2006-27374A
[Patent Literature 3] JP2001-260800A In conventional passenger seat airbag devices, after the inflator is actuated and the airbag starts to inflate, the gas in the airbag is not discharged through the vent hole until the airbag is almost completely inflated. Therefore, the pressure in the airbag is high from the start of inflation, and if an interfering object is close to the instrument panel, the input to the interfering object is large.

SUMMARY OF INVENTION

The present invention is made in view of the above-described conventional situation, and it is an object of the present invention to provide an airbag and an airbag device for a passenger seat that, if the passenger seat airbag starts to inflate with an interfering object close to the instrument panel, quickly discharge the gas in the airbag to reduce the input to the interfering object, and an automobile equipped with this airbag device.

In a passenger seat airbag installed in an instrument panel in front of a passenger seat of a vehicle according to the present invention, an amount of gas discharged from an airbag body is variable depending on a state of contact with a windshield.

In an embodiment of the present invention, a gas discharge hole is provided on a windshield side of the airbag body.

In an embodiment of the present invention, a blocking member that blocks discharge of the gas through the gas discharge hole is provided on an outer surface side of the airbag body.

In an embodiment of the present invention, at least part of the blocking member is sandwiched between the airbag body and the windshield so that the gas discharge hole is brought into a closed state.

In an embodiment of the present invention, the blocking member is flap-like, and a front edge thereof is sewn to the airbag.

In an embodiment of the present invention, an upper surface patch cloth is provided on an upper surface of the airbag body, and the blocking member extends from the upper surface patch cloth.

In an embodiment of the present invention, at least a pair of edges of the blocking member are sewn to the airbag.

An airbag device of the present invention comprises the airbag of the present invention, and an inflator that supplies gas to the airbag.

An automobile of the present invention is equipped with such an airbag device.

In another embodiment of the present invention, a gas discharge hole is provided in a part of a front surface of the airbag that is in contact with neither the windshield nor an instrument panel when the airbag has been inflated and deployed to its final deployed shape.

ADVANTAGEOUS EFFECTS OF INVENTION

In the airbag device of the present invention, if an inflator is actuated when an interfering object is close to an instrument panel, the airbag comes into contact with the interfering object before the airbag has been inflated to its final deployed shape. In this case, the vicinity of the gas discharge hole provided on the windshield side of the airbag body is not in contact with the windshield, and is away from the windshield. Therefore, the gas in the airbag in contact with the interfering object flows out through the gas discharge hole. The amount of initially discharged gas is thereby increased. Thus, the airbag and airbag device of the present invention are configured such that the input to an interfering object close to the instrument panel is reduced.

BRIEF DESCRIPTION OF DRAWINGS

FIG. 3 is a perspective view of the vicinity of a front vent hole according to an embodiment.

DESCRIPTION OF EMBODIMENTS

Figure 1A:
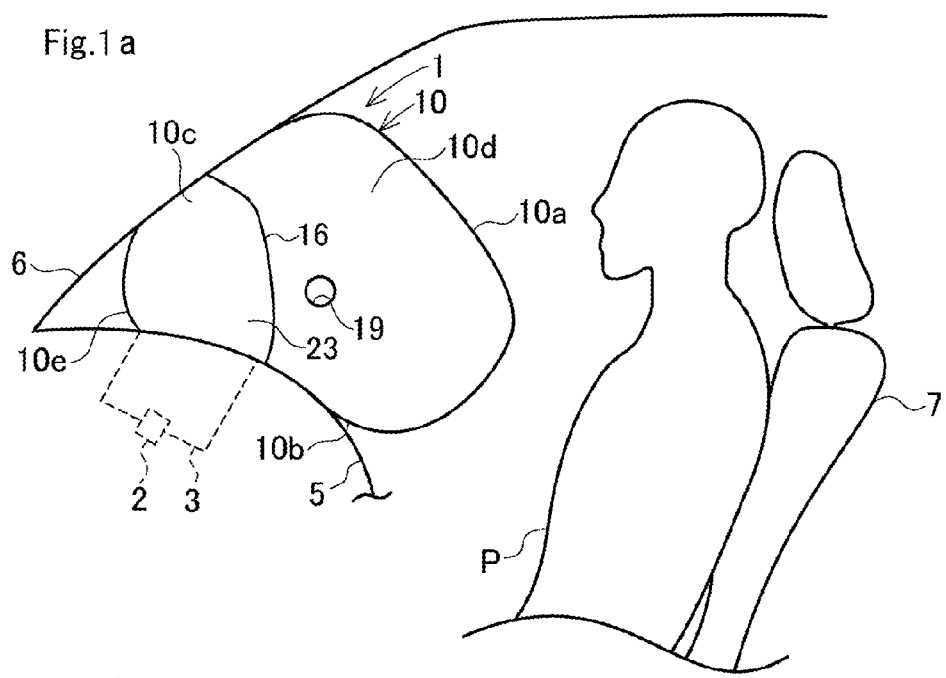
FIG. 1a and FIG. 1b are side views of an airbag device according to an embodiment.

An airbag device according to a first embodiment will be described below with reference to FIG. 1 to FIG. 4b.

The airbag device according to this embodiment includes an airbag 1 that is normally folded during times and is inflated and deployed in an emergency, an inflator 2 that supplies gas to the airbag 1, and a retainer 3 to which the airbag 1 and the inflator 2 are fixed. This airbag device is a passenger-seat airbag device, and is housed in an instrument panel 5 disposed in front of a passenger seat 7. The airbag 1 is inflated and deployed in a space surrounded by a passenger P, the instrument panel 5, and a windshield 6. Side vent holes 19 are provided in both the left and right side surfaces of the airbag 1, and a front vent hole 20 is provided in the front surface.

The inflator 2 has a substantially cylindrical outer shape, and gas jetting ports are formed in the side peripheral surface of the distal end placed inside the airbag 1. The inflator 2 is fitted into an opening formed in the retainer 3, and is fixed to the retainer 3 with a fixing member such as a bag ring. However, the shape and the fixing method of the inflator 2 are not limited to this.

The airbag 1 has an airbag body 10, a lower surface patch cloth 21 disposed on a lower surface portion 10b of the airbag body 10, an upper surface patch cloth 22 disposed on an upper surface portion 10c of the airbag body 10, and side surface patch cloths 23 disposed on side surface portions 10d of the airbag body 10. The outer surface of the front part of the airbag body 10 is covered by the lower surface patch cloth 21, the upper surface patch cloth 22, and the side surface patch cloths 23.

The airbag 1 is inflated and deployed substantially in front of the passenger P. A front portion 10a of the airbag body 10 faces the passenger P. The upper surface portion 10c of the airbag body 10 extends from a proximal end portion 10e on the side opposite to the passenger P, along the windshield 6 to above the front portion 10a. The lower surface portion 10b extends from the proximal end portion 10e along the upper surface of the instrument panel 5, and further extends to below the front portion 10a. The pair of both side surface portions 10d cover both sides of a part surrounded by the front portion 10a, the lower surface portion 10b, and the upper surface portion 10c.

Figure 1B:
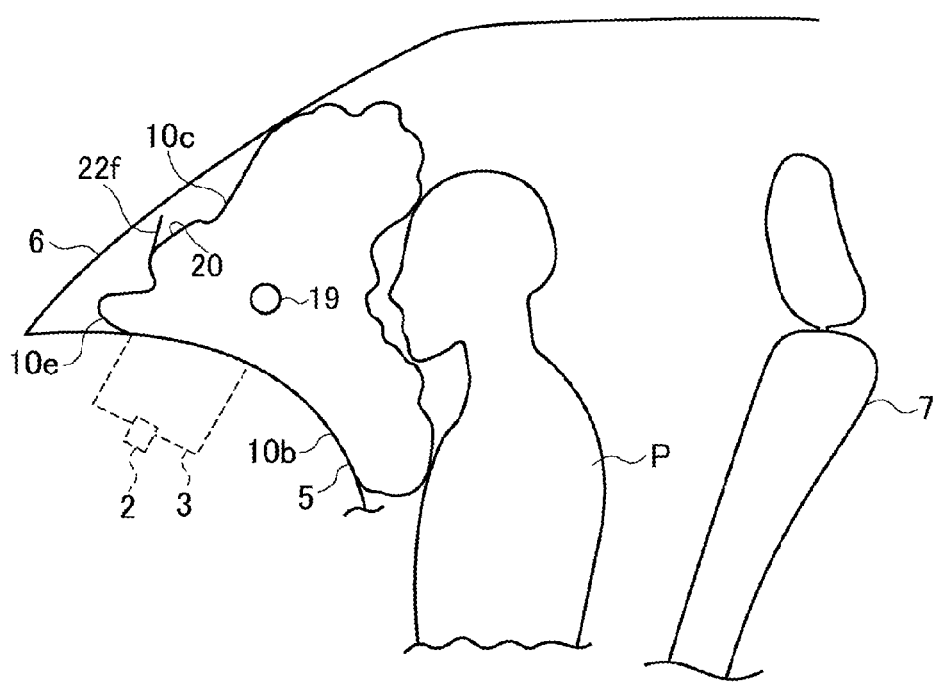
Figure 2A:
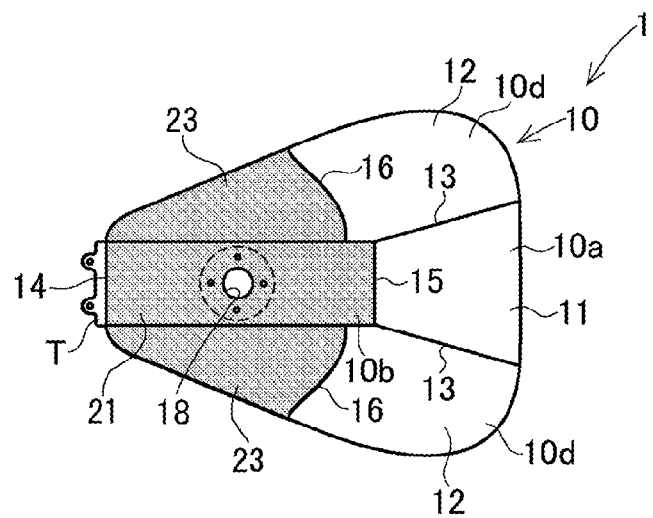
FIG. 2a is a bottom view of an airbag according to an embodiment.
Figure 2B:
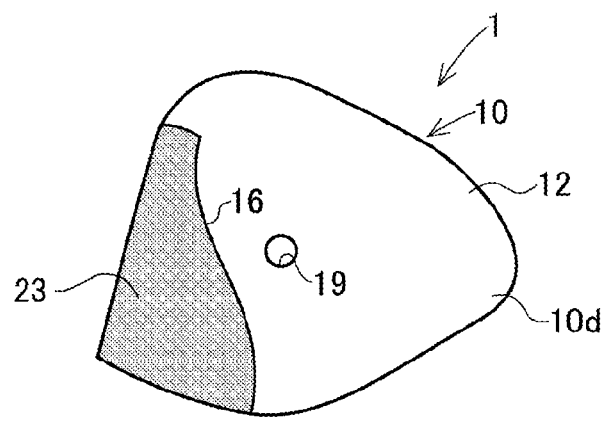
FIG. 2b is a side view thereof.
Figure 2C:
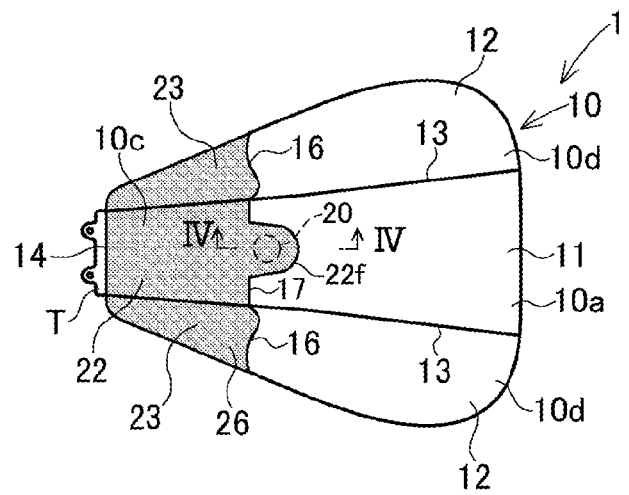
FIG. 2c is a top view thereof.
Figure 4:
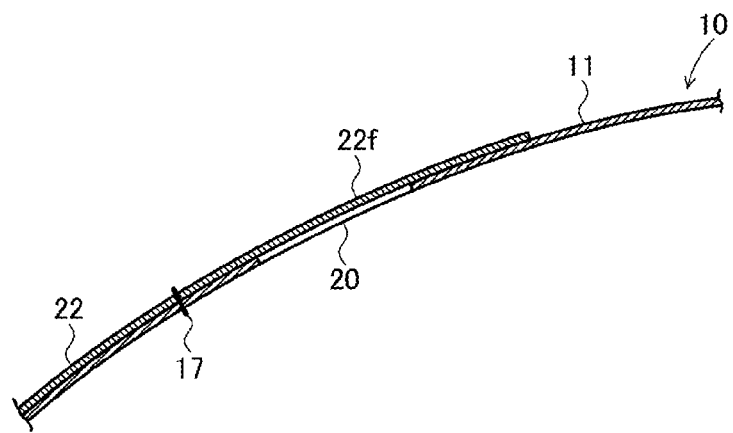
FIGS. 4a and 4b are sectional views taken along line IV-IV of FIG. 2.
Figure 4:
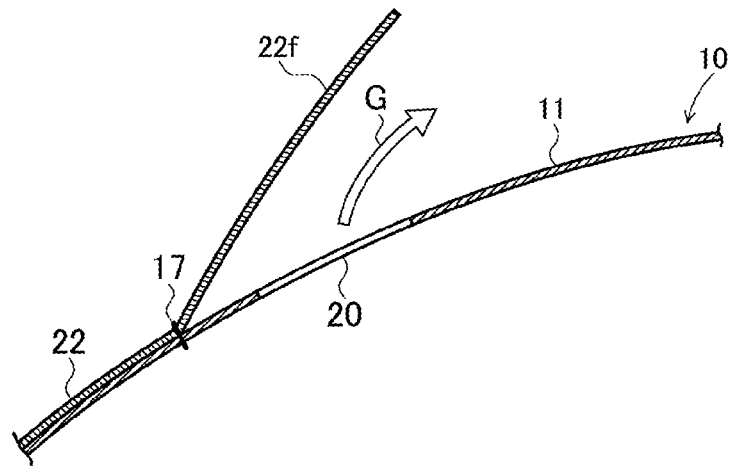

FIG. 2a to FIG. 2c show a state where the airbag 1 is removed from the airbag device shown in FIGS. 1a and 1b and is inflated and deployed. That is, in FIG. 2a to FIG. 2c, the airbag 1 is not fixed to the retainer 3, and the inflated and deployed shape of the airbag 1 is a freely inflated shape out of contact with the windshield 6 and the instrument panel 5.

The airbag body 10 is composed of a center panel 11 that forms the front portion 10a, the lower surface portion 10b, and the upper surface portion 10c, and a pair of side panels 12 that are sewn to both sides of the center panel 11 and that form the side surface portions 10d. The airbag body 10 is formed by sewing together the center panel 11 and the side panels 12 by seams 13, and sewing together both ends of the center panel 11 by a seam 14.

In each of FIGS. 2a to 2c, the lower surface patch cloth 21, the upper surface patch cloth 22, and the side surface patch cloths 23 are dotted for the purpose of illustration. The panel configuration of the airbag body 10 is not limited to that shown in the figures.

As shown in FIG. 2a, the lower surface patch cloth 21 is disposed on the lower surface portion 10b of the airbag body 10 so as to cover the center panel 11. Both sides of the lower surface patch cloth 21 are sewn to the airbag body 10 by the seams 13, the front end thereof is sewn to the airbag body 10 by the seam 14, and the back end thereof is sewn to the center panel 11 by a seam 15. An inflator opening 18 for inserting the inflator 2 is formed in the lower surface portion 10b of the center panel 11 and the lower surface patch cloth 21.

Tabs T for alignment may be formed at both ends of the center panel 11. The airbag body 10 may be fixed by overlapping and pinning the tabs T, and then a predetermined sewing operation may be performed.

As shown in FIG. 2b, the side surface patch cloths 23 are disposed on the side panels 12. The side surface patch cloths 23 are sewn to the airbag body 10 by the seams 13 as shown in FIGS. 2a and 2c, and the back ends thereof are sewn to the side panels 12 by seams 16 as shown in FIGS. 2a to 2c. The side vent holes 19 are provided behind the seams 16 of the side panels 12.

As shown in FIG. 2c, the upper surface patch cloth 22 is disposed on the upper surface portion 10c of the airbag body 10 so as to cover the center panel 11. Both sides of the upper surface patch cloth 22 are sewn to the airbag body 10 by the seams 13, the front end thereof is sewn to the airbag body 10 by the seam 14, and the back end thereof is sewn to the center panel 11 by a seam 17.

The seam 17 extends laterally near the front edge of the front vent hole 20. A flap-like valve cloth 22f covering the front vent hole 20 extends backward from the back edge of the upper surface patch cloth 22. The left and right side edges and back edge of the valve cloth 22f are not sewn to the center panel 11, and the valve cloth 22f can have a closed state where it covers the front vent hole 20 and an open state where it is away from the front vent hole 20.

The lower surface patch cloth 21, the upper surface patch cloth 22, and the side surface patch cloths 23 are made, for example, of the same material as base fabric forming the airbag body 10 (the center panel 11 and the side panels 12). This base fabric is, for example, woven fabric made from nylon yarn, polyester yarn, or the like, and one surface thereof is a coated surface that is coated with a coating agent such as silicone resin. The outer surfaces of the lower surface patch cloth 21, the upper surface patch cloth 22, and the side surface patch cloths 23, that is, surfaces on the side opposite to the surfaces facing the airbag body 10 are coated surfaces.

The inflator 2 is inserted into the inflator opening 18 of the airbag 1 and an opening formed in the retainer 3, and the inflator 2 is fixed together with the airbag 1 to the retainer 3 with a fixing device such as a bag ring. The airbag 1 is folded, the folded body is housed in the retainer 3, and the airbag device is formed.

When an automobile equipped with this airbag device has a collision, the inflator 2 is actuated, gas is supplied from the inflator 2 into the airbag 1, and the airbag 1 inflates out of the instrument panel 5.

When the passenger P is away from the instrument panel 5, for example, when the passenger P is sitting with his/her back on the seat back of the passenger seat 7 as shown in FIG. 1a, the airbag 1 is inflated and deployed in a space surrounded by the instrument panel 5, the windshield 6, and the passenger P. The vicinity of the front vent hole 20 of the airbag 1 that has been inflated and deployed to its final deployed shape is in contact with the windshield 6, and the valve cloth 22f is sandwiched between the windshield 6 and the upper surface portion 10c of the airbag body 10 and closes the front vent hole 20. When the airbag 1 comes into contact with the passenger P in this state, the gas in the airbag 1 flows out through the side vent holes 19.

If the inflator 2 is actuated when the passenger P is close to the instrument panel 5 as shown in FIG. 1b, the airbag 1 comes into contact with the passenger P before the airbag 1 has been inflated to its final deployed shape.

In this case, the vicinity of the front vent hole 20 of the airbag 1 is not yet in contact with the windshield 6, and is away from the windshield 6. Therefore, the gas in the airbag 1 in contact with the passenger P not only flows out through the side vent holes 19, but also pushes the valve cloth 22f off the upper surface portion 10c of the airbag, and flows out through the front vent hole 20.

As described above, this airbag device is configured such that the amount of gas discharge through the gas discharge hole (front vent hole 20) provided on the windshield 6 side of the airbag body 10 is variable depending on the state of contact between the airbag 1 and the windshield 6, and is configured taking into account a passenger P close to the instrument panel 5.

Although FIG. 1b shows a state where the passenger P is close to the instrument panel 5, even if another interfering object such as a small passenger such as a child or a child seat is close to the instrument panel 5, the gas in the airbag 1 flows out through the front vent hole 20, and the input to the interfering object can be reduced.

Although, in the above-described embodiment, the valve cloth 22f is provided integrally with the upper surface patch cloth 22, a valve cloth made of a cloth separate from the upper surface patch cloth may be provided. In this case, other part of the valve cloth may be sewn to the airbag.

Figure 5A:
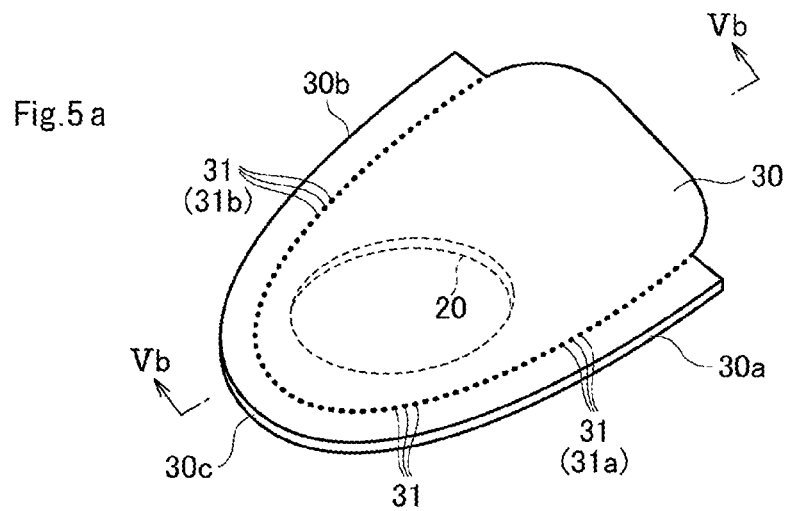
FIG. 5a is a perspective view of a part of an airbag according to another embodiment.
Figure 5B:
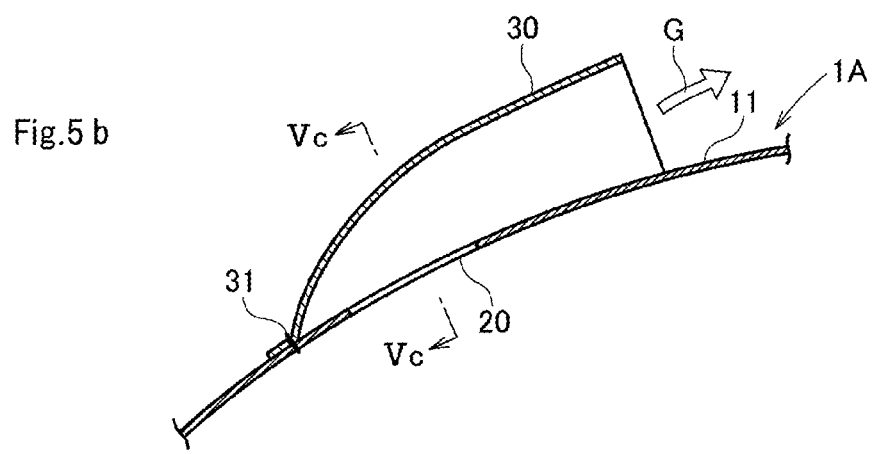
FIG. 5b is a sectional view taken along line Vb-Vb of FIG. 5a, FIG. 5c is a sectional view taken along line Vc-Vc of FIG. 5b.
Figure 5C:
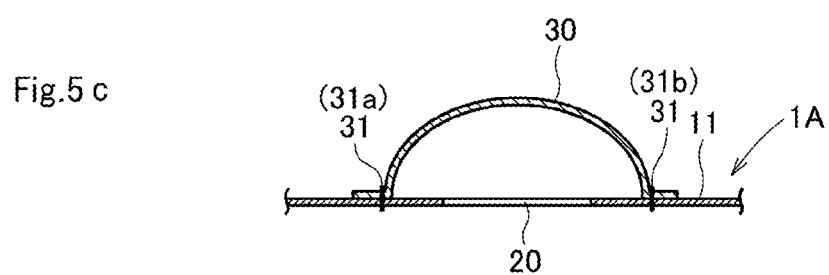
FIG. 5d is a sectional view showing a state where a valve cloth covers a front vent hole.
Figure 5D:
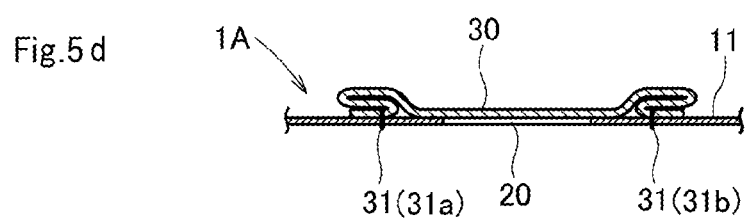

FIGS. 5a to 5d show an example thereof, FIG. 5a is a perspective view of the vicinity of the front vent hole 20 and a valve cloth 30, FIG. 5b is a sectional view taken along line Vb-Vb of FIG. 5a, FIG. 5c is a sectional view taken along line Vc-Vc of FIG. 5b, and FIG. 5d is a sectional view of the same part as FIG. 5c, showing a state where the valve cloth 30 covers the front vent hole 20.

This valve cloth 30 is disposed on the outer surface side of the airbag 1A, and a left side edge 30a, a right side edge 30b, and a front edge 30c are sewn to the center panel 11 of the airbag 1A by a seam 31. The front edge 30c may not be sewn.

In a state sewn to the center panel 11, the length of the valve cloth 30 from the left seam 31a to the right seam 31b is larger than the length of the center panel 11 from the left seam 31a to the right seam 31b. Therefore, if the gas pressure in the airbag 1A acts on the valve cloth 30 with the vicinity of the front vent hole 20 of the airbag 1A out of contact with the windshield, as shown in FIGS. 5a to 5c, the valve cloth 30 moves away from the vicinity of the front vent hole 20, and gas G flows out through the front vent hole 20.

When the vicinity of the front vent hole 20 is in contact with the windshield 6, as shown in FIG. 5d, the valve cloth 30 covers the vicinity of the front vent hole 20 of the center panel 11, and closes the front vent hole 20.

Although the left side and the right side of the valve cloth 30 are sewn to the airbag in FIGS. 5a to 5d, the front side and the back side may be sewn to the airbag.

In an airbag 1A having the valve cloth 30 of FIGS. 5a to 5d, the front vent hole 20 may be disposed in a part of the front surface of the airbag 1A that is in contact with neither the instrument panel 5 nor the windshield 6 when the airbag 1A has been inflated and deployed to its final deployed shape. For example, the front vent hole may be provided in the foremost part of the airbag.

Although, in the above-described embodiment, an example has been described in which a valve cloth 30 made of the same material as base fabric forming the airbag body 10 is used as a blocking member that blocks the discharge of gas through the front vent hole 20, a valve cloth made of a material other than base fabric, such as a resin film, a resin plate, or vinyl, may be used.

The present invention is not limited to the above-described embodiments, and various changes may be made without departing from the spirit of the present invention.

Although the present invention has been described in detail with regard to specific embodiments, it will be apparent to those skilled in the art that various modifications may be made without departing from the spirit and the scope of the present invention.

This application is based on Japanese Patent Application No. 2016-037413 filed on Feb. 29, 2016, the entire content of which is hereby incorporated by reference.

The invention claimed is:

1. A passenger seat airbag installed in an instrument panel in front of a passenger seat of a vehicle, the airbag comprising an airbag body;
   wherein an amount of gas discharged from the airbag body is variable depending on a state of contact with a windshield,
   wherein a gas discharge hole is provided on a windshield side of the airbag body,
   wherein a blocking member that blocks discharge of the gas through the gas discharge hole is provided on an outer surface side of the airbag body,
   wherein the blocking member is flap-like, and a front edge thereof is sewn to the airbag,
   wherein an upper surface patch cloth is provided on an upper surface of the airbag body, and the blocking member extends from the upper surface patch cloth,
   wherein a blocking portion of the blocking member extends backward from a back edge of the blocking member that is spaced forwardly of the gas discharge hole and sewn to the airbag,
   wherein the blocking portion is sized to extend over and completely cover the gas discharge opening and the blocking portion is not sewn to the airbag to allow the blocking portion to shift away from the airbag so the blocking portion is not in overlying relation to the gas discharge hole as gas is discharged therefrom.

2. The airbag according to claim 1, wherein at least the blocking portion of the blocking member is sandwiched between the airbag body and a windshield so that the gas discharge hole is brought into a closed state.

3. An airbag device comprising:
   the airbag according to claim 1, and
   an inflator that supplies gas to the airbag.

4. An automobile equipped with the airbag device according to claim 3.

* * * * *